UNITED STATES PATENT OFFICE.

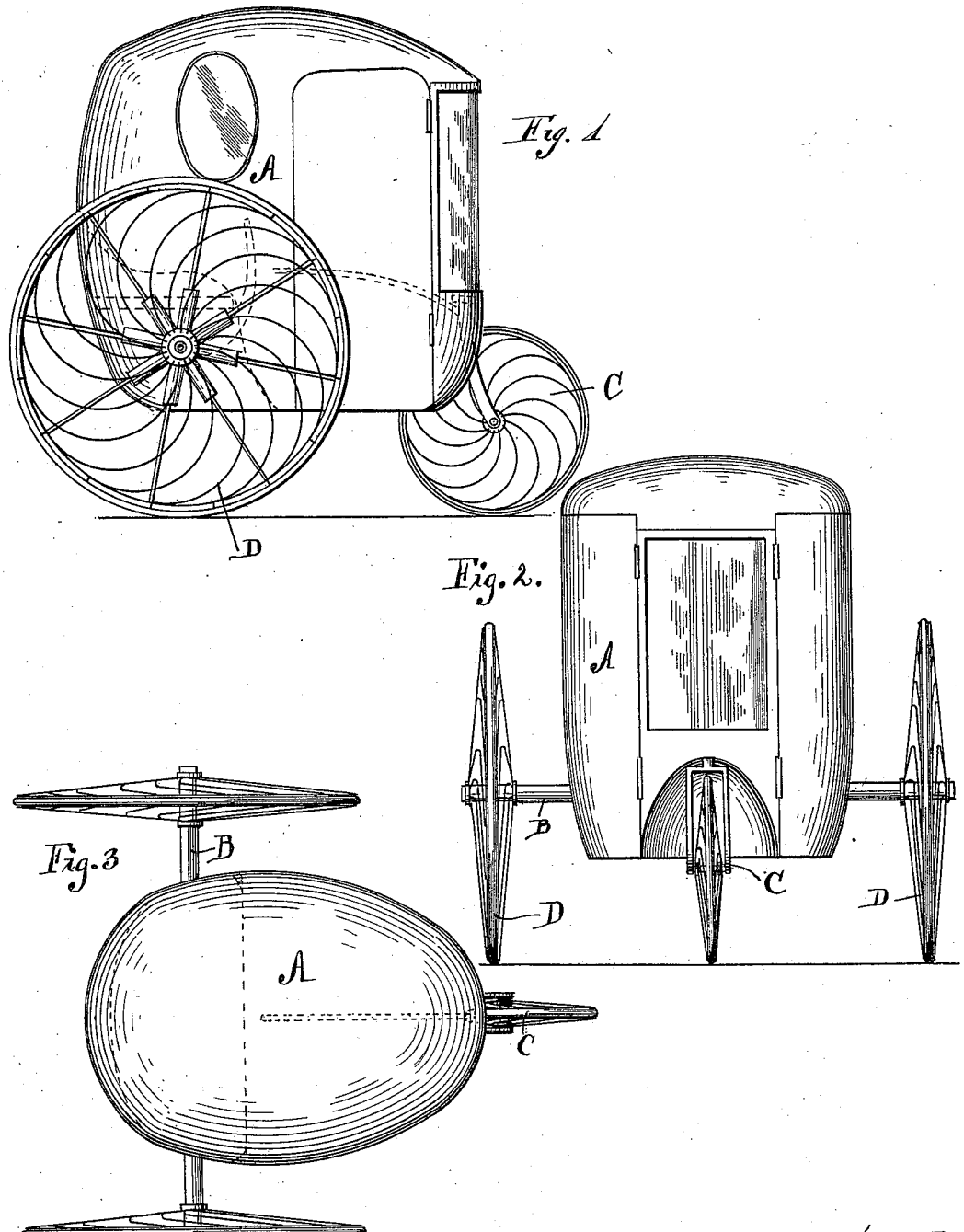

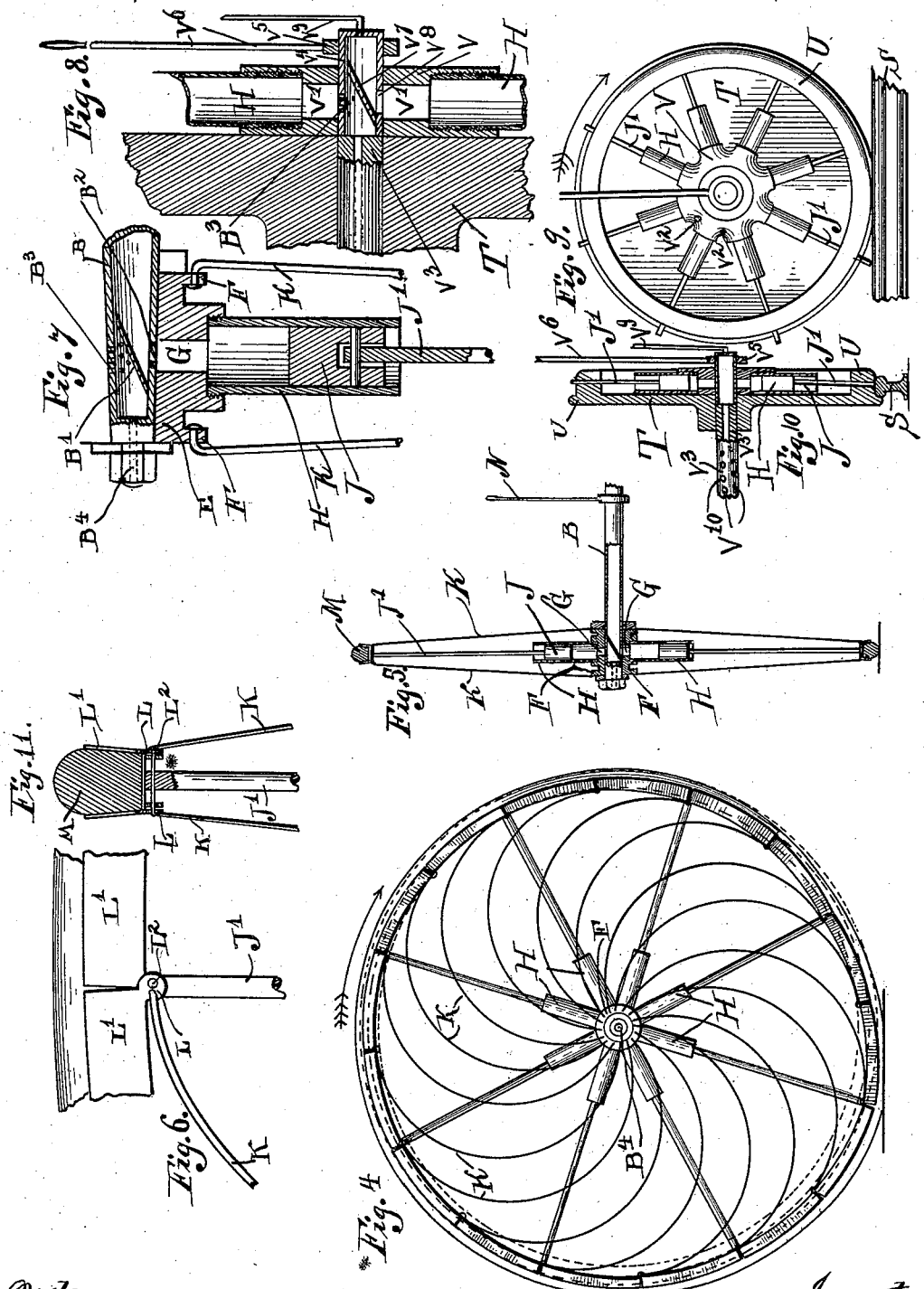

CHARLES F. GODDARD, OF CHICAGO, ILLINOIS.

MOTOR AND WHEEL FOR VEHICLES.

SPECIFICATION forming part of Letters Patent No. 574,200, dated December 29, 1896.

Application filed July 24, 1895. Serial No. 557,031. (No model.)

*To all whom it may concern:*

Be it known that I, CHARLES F. GODDARD, a citizen of the United States, residing at Chicago, in the county of Cook and State of Illinois, have invented a certain new and Improved Motor and Wheel, of which the following is a specification.

My invention relates to a new species of motor and wheel for vehicles. It is applicable to bicycles, tricycles, and horseless vehicles, as well, of course, as to other kinds of vehicles, but I have illustrated it as applied to the horseless-vehicle types.

My drawings are to be taken as, in a sense, diagrammatic or illustrative rather than descriptive, since it will be obvious to any one that simple changes and variations can be made from what I have illustrated in the drawings which would result in the application of my improvement to many and various kinds of vehicles. Moreover, it will be equally evident that certain features of my invention are capable of independent or separate use. The wheels which I have illustrated are capable of use independent of their association with the other features whereby they become parts of the motor, and the pistons which are associated with the wheel, as here illustrated, are capable of being actuated in various other ways and by other means than as here set out. Indeed, I here have attempted to illustrate only one particular application of my invention, and these several features I have combined together for convenience when in a single apparatus.

My invention is illustrated in the accompanying drawings, wherein—

Figure 1 is a side view of a horseless vehicle to which my invention is applied. Fig. 2 is a front view of the same. Fig. 3 is a plan view. Fig. 4 is an enlarged view of one of the wheels. Fig. 5 is a vertical section through the same. Fig. 6 is a detail of the rim portions of the wheel. Fig. 7 is an enlarged section of the hub of the wheel. Figs. 8, 9, and 10 are views of a modification consisting of an application of my invention to solid or car wheels. Fig. 11 is a cross-section through the rim.

As previously suggested, I have here shown my invention as applied in but one way; that is to say, I have contemplated the use of gases or the like to operate it as a motor; but, as I will hereinafter explain, the invention is not limited to such use.

Like parts are indicated by the same letters in all the figures.

A is the body of the vehicle, supported on the axle B and also on the forward steering-wheel C.

The driving-wheels are indicated generally by the letter D. The wheel D consists of the hub portion E, having the flanges F F near each end and also having the slots G G and a series of screw-threaded recesses, in which the cylinders H H are firmly secured. Each cylinder has reciprocating therein the piston J, loosely secured to the piston-rod J'. The axle B is hollow and provided with the diaphragm B' and the lower slot $B^2$, adapted to successively register with the slots G G as the hub rotates upon the axle.

$B^3$ $B^3$ are a series of apertures on the opposite side of the diaphragm and passing through the shell of the axle B and placed in the path of the slots G G.

The hollow portion of the axle on the outer side of the diaphragm B' opens by a passage $B^4$ into the outer air.

K K are the spokes, which in this particular wheel in question are made of spring-wire, and there are two sets of them, one forming the outer and the other the inner portion of the wheel. They are turned and secured at their inner ends to the flanges F F, and at their outer ends they are secured each to an enlargement L on one section of the rim. The rim is composed of sections L' L', each provided at both ends with the two enlargements L L. One of the piston-rods J' is brought toward the abutting ends of two of such sections, and a pin $L^2$ is passed through such piston-rod and through the four associated enlargements L, whereby the two sections of the rim and the spoke are pivotally connected together. This pin may consist of one end of the wire spoke brought over at right angles and passed through these several sections.

M is the elastic, preferably rubber, tire, which is placed between the side portions or flanges of the rim.

Thus it will be seen that I have provided a sectional rim capable of elongation, so as to assume, for example, a somewhat oval or elliptical form. Moreover, I have provided a system of spokes whereby a spring effect is introduced between the rim and the axle, and either or both of these features combined can be used in a single wheel independent of the other features of my invention.

N is a controlling-handle on the axle B. It is entirely possible that other means might be employed for constructing the rim, so as to make it applicable for the purposes of my motor device, but I have shown this form as being the preferred form. Other spokes could be used also, so that my motor device is equally independent of the precise construction here illustrated, though, as above stated, I consider this form of wheel best suited for the particular motor devices which I have associated therewith.

I will now describe the use and operation of so much of my device as is above particularly referred to.

It will be understood, of course, that there is a suitable reservoir for the particular motor fluid designed to be used, such reservoir being associated with the carriage and provided with a discharge-pipe and controlling-valve, such pipe opening into the hollow axle. These features of the device are capable of such wide variation that I have not thought it necessary to illustrate them. The requirements of the case would vary with each fluid employed, and the construction of such fluid-receptable would be perfectly obvious to any mechanic. The main point is this: that the carriage is to be supplied with a reservoir containing gas, if it be a gas-engine, compressed air, if it be a compressed-air engine, or steam, if it be a steam-engine, and the like. Of course in the case of gas there would be the ordinary or any suitable firing device in connection with the cylinders or other proper parts, but these things being all of them parts of the ordinary engine construction I have not thought it necessary to elaborate on them here. It is enough that the hollow axle B is suitably supplied with the motor fluid.

Now if attention is turned to Fig. 4 it will be observed that, beginning at the bottom, the spoke at the right is shortened, or, in other words, its piston is well up to the hub in its cylinder, while the spoke at the left is projected its entire possible length. Now this is accomplished by the following means: The slot $B^2$ in the axle is placed on the lower side thereof, its angular position with reference to the vertical line being adjustable by means of the handle N, which may rock the axle. We will assume that this slot has been set on a line running through the axle and the arrow. The slot opening into the cylinder associated with the spoke at the left of the vertical line has therefore just registered with such slot $B^2$ and a charge of the motor fluid has been introduced into the cylinder and the piston has been forced out in the manner indicated. This obviously will cause the wheel to turn in the direction indicated by the arrow, and it will continue to turn until the next spoke has passed into the same position, when a like operation will take place and the wheel will be given another forward impetus. Thus the operation will continue, and there may be as many or as few of such spokes or cylinders as occasion may require or experience may show to be necessary. As the spoke continues its revolution the slot G associated therewith will begin to register with the several holes $B^3$ $B^3$ on the opposite side of the axle and on the outer side of the diaphragm B'. Thus this cylinder will continue to exhaust gradually, having the period of its passage around to the vertical position again as a season for its exhaustion. The exhaust takes place through the end of the axle. As previously stated, I desire these figures to be considered somewhat as diagrams and not as limitations as to the construction and size of the various parts; but the spirit and essence of my invention I think is made manifest. Those numerous details which can easily be applied for any of various purposes desired in connection with such work are not essentials and therefore are not here particularly recited or detailed. I have, however, thought it desirable to indicate a form of my invention in which it appears as applied to a solid wheel, as, for example, a railroad-car wheel. This is illustrated in Figs. 8, 9, and 10.

S is the rail. T is the car-wheel, or particularly the solid portion thereof, and this car-wheel is provided with the flange U, having therethrough a series of holes for the piston-rods J'. In this case the hub construction is somewhat different. There are, however, the cylinders H H and the pistons J J and the piston-rods J' J'. V is a hub-like portion provided with the slots V' V', which open into the cylinders H H. This hub-shaped portion may be cast continuous with the wheel T or may be bolted thereto by the bolts $V^2$ $V^2$ or secured in any other convenient manner. Rigidly keyed to the wheel, so as to rotate therewith, is the tubular axle $V^3$, and concentric therewith is the tubular $V^4$ within the hub. This part does not rotate, but is associated with an encircling ring $V^5$, controlled by the hand-lever $V^6$, whereby it may be rocked in either direction. This lever also holds it from rotating. In this tubular arrangement is the diaphragm $V^7$, which separates it into two parts, and in one part is the slot $V^8$, adapted to open into the slot V' and the connection $V^9$, which leads to the fluid reservoir or supply. The tubular portion of the axle $V^3$ extends far enough only to make room for the exhaust-holes $V^{10}$.

The use and operation in this case are substantially the same as in the previous case. The short tubular portion within the hub is rocked by means of the hand-lever $V^6$ to determine the angular position of the slot $V^8$ and thus to determine the point of action of the spoke which gives the impetus. The exhaust is in like manner carried out by the escape of the gases from the cylinder through the holes $V^3$ in the tubular portion within the hub, thence through the tubular axle, and thence through the exhaust-holes $V^{10}$. Of course in this case I have no flexible tire and no spring-spokes.

The spokes in the form shown in Fig. 4 are attached to the hub at one side thereof, though this is not indispensable, and in the same figure the spokes are formed curved, though this is not indispensable if they be attached at one side of the hub. The spring effect could be obtained by use of such spokes as I have suggested even without the flexible rim. The propelling-rods are arranged, preferably, in substantially a radial position, though of course they might be varied somewhat from such position. I have shown the central tubular portion as consisting of a single tube which is either part of the axle or concentric therewith, and this is divided into two parts by the diaphragm. It is plain that this construction could be very greatly varied without departing from the spirit of my invention. The "energizing fluid," as I have called it, may be steam or gas or any of a multitude of such fluids. I have spoken somewhat loosely of the part hub, but it will be easily understood what is meant by the same. I have spoken of the parts indicated by the letters $B^3$ as holes, though of course they may be slots, and of the part $B^8$ as a slot, though of course it may be a round hole. The preferred forms are as represented. There may be but one of these holes $B^3$, though the preferred form is a series.

I claim—

1. A wheel comprising a hub, a rim consisting of a series of pieces U-shaped in cross-section, and a series of spokes connecting the rim and the hub arranged so that a spring effect is introduced between the hub and the rim, the rim consisting of sections hinged to each other, means associated with said wheel for moving said sections with relation to one another and an elastic tire seated in the U-shaped rim-sections.

2. The combination of a wheel with a series of substantially radially-disposed cylinders, a series of pistons and outwardly-projecting rods associated with such cylinders, and means for successively introducing an energizing fluid into such cylinders to outwardly impel the rods and thus propel the wheel, a flexible rim with which said rods are connected, said hub and rim being connected by flexible spokes.

3. The combination of a wheel with a conduit leading to the hub thereof, a series of cylinders arranged about the hub, a passage-way from the hub to the line of motion of the cylinders whereby they are successively connected with such conduit, pistons and piston-rods associated with such cylinders and adapted to be moved outwardly by an energizing fluid, and means for supplying such energizing fluid to the conduit, a flexible rim to which said piston-rods are connected, and a series of flexible posts connected to said hub and rim.

4. The combination of a wheel with a hub-like portion slotted and hollow, a series of cylinders rotating with the wheel about the hub and provided each with a supply-slot, and pistons and rods associated one with each cylinder and adapted to be moved outwardly when the energizing fluid is introduced through such slots, a rim consisting of a series of pieces, U-shaped in cross-section, and hinged together, an elastic tire seated in the U-shaped cross-section, and a series of elastic spokes connecting said hub with said rim, substantially as described.

5. The combination of a wheel with a hub-like portion slotted and hollow, a series of cylinders rotating with the wheel about the hub and provided each with a supply-slot, pistons and rods associated one with each cylinder and adapted to be moved outwardly when the energizing fluid is introduced through such slots, and means for rocking such hub-like portion so as to vary the angular position of the slot to determine the point at which the piston shall be outwardly forced.

6. The combination of a wheel with a conduit leading to the hub thereof, a series of cylinders arranged about the hub, a passage-way from the hub to the line of motion of the cylinders whereby they are successively connected with such conduit, pistons and piston-rods associated with such cylinders and adapted to be moved outwardly by an energizing fluid, means for supplying such energizing fluid to the conduit, and a discharge-way provided with a series of inlet-apertures in the path of the cylinders whereby they are successively brought into connection with such passages to exhaust, each cylinder being repeatedly connected with said discharge-way, substantially as described.

7. The combination of a wheel-like construction with a hollow central portion divided into two parts, a supply-way connected with one part and discharge-apertures leading from the other, a hole through the wall of that part connected with the supply and a hole through the wall of the other part, and a series of cylinders rotating about such hollow part and adapted each successively to connect with each of such holes, and a series of pistons and piston-rods associated one with each cylinder and adapted to be forced outwardly when the energizing fluid is admitted to each cylinder.

8. The combination of a wheel-like construction with a hollow central portion divided into two parts, a supply-way connected with one part and discharge-apertures leading from the other, a hole through the wall of that part connected with the supply and a series of holes through the wall of the other part, a series of cylinders rotating about such hollow part and adapted each successively to connect with said hole and said series of holes, and a series of pistons and piston-rods associated one with each cylinder and adapted to be forced outwardly when the energizing fluid is admitted to each cylinder, whereby the energizing fluid is received at a given point and is subsequently exhausted continuously through a considerable portion of its revolution.

9. The combination of a wheel-like construction with a central tubular portion divided by a diaphragm into two parts, a supply-way leading into one part and a discharge-aperture leading from the other part, a hole through the wall of that part connected with supply and a series of holes leading from the other part, a series of cylinders revolving around such tubular portion, said apertures and holes being in the path of said cylinders so that they are successively in connection therewith, and means for introducing the energizing fluid through such supply-passage and thence into the cylinders, and a series of pistons and piston-rods associated one with each cylinder.

10. The combination of a hub with a sectional rim the sections of which are adapted to move relatively and means for elastically connecting the two together, a series of substantially radially-disposed movable rods connected with said rim, and means for moving such rods outwardly to propel the wheel.

Chicago, Illinois, July 20, 1895.

CHARLES F. GODDARD.

Witnesses:
FRANCIS M. IRELAND,
LILLEY JOHNSTONE.